UNITED STATES PATENT OFFICE.

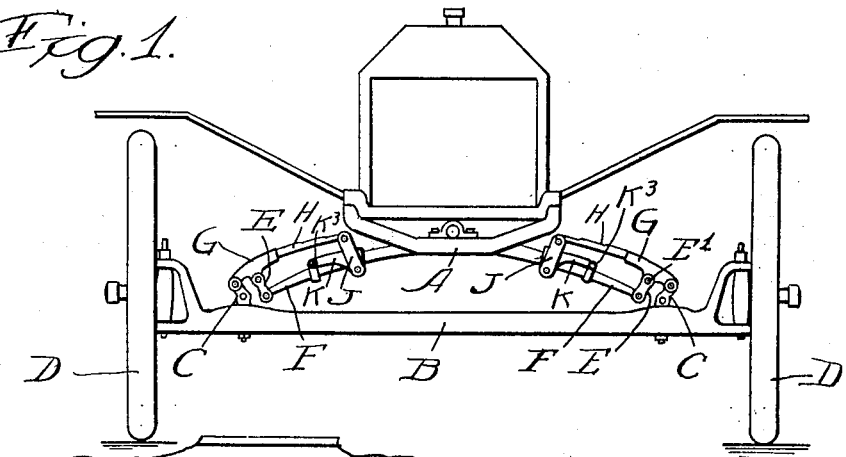
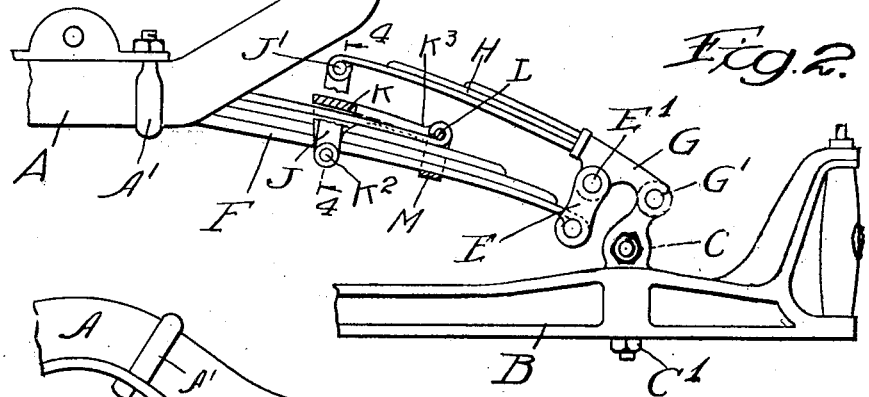
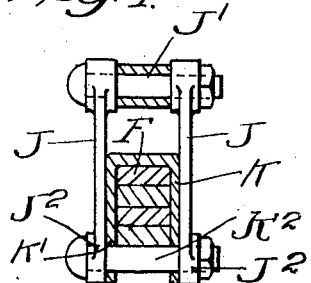
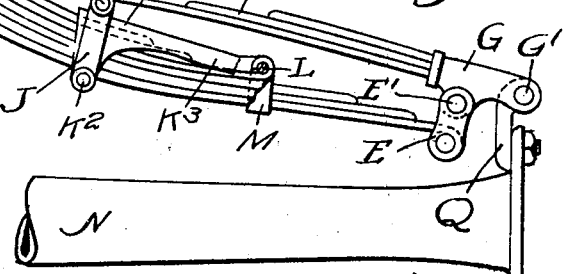

DAVID NETTENSTROM, OF CHICAGO, ILLINOIS.

AUXILIARY SPRING FOR MOTOR-VEHICLES.

1,336,481.  Specification of Letters Patent.  Patented Apr. 13, 1920.

Application filed December 20, 1915. Serial No. 67,702.

*To all whom it may concern:*

Be it known that I, DAVID NETTENSTROM, a citizen of the United States, residing at Chicago, in the county of Cook and State of Illinois, have invented new and useful Improvements in Auxiliary Springs for Motor-Vehicles, of which the following is a specification, reference being had to the accompanying drawings, forming a part thereof.

The purpose of this invention is to provide means which shall be readily applicable to an existing spring suspension of a motor vehicle and adapted to improve the action of such spring suspension so as to increase the ease of riding while decreasing the tendency to rebound, such as exists in the original spring system. It consists of the features and elements and their combinations shown in the drawings and hereinafter described as indicated by the claims.

In the drawings:

Figure 1 is a front elevation of a motor vehicle equipped with the devices embodying this invention.

Fig. 2 is a detail view on a larger scale showing certain parts from the same point of view as in Fig. 1.

Fig. 3 is a detail view on the scale of Fig. 2 showing in elevation the corresponding parts for the rear axle spring.

Fig. 4 is a detail section taken at line 4—4 on Fig. 2.

The devices embodying this invention are shown in the drawings as applied to a motor vehicle in which the spring suspension consists simply of a comparatively long semi-elliptic leaf spring interposed between the frame, A, and each of the axles, such spring extending over and in the same vertical plane as the axle which it connects to the frame. It will be understood, however, that the invention is not limited in its application to this type of spring suspension, as will appear upon further description.

Referring first to Fig. 1 and the enlarged detail view of Fig. 2, it may be noted that the front axle, B, has bolted to it a bracket or perch, C, shown with its upper end bent laterally outward from the vehicle body, extending obliquely upward and toward the road wheel, D, at the same side of the vehicle. In its original arrangement this bracket, C, is mounted to extend obliquely inward and toward the body of the vehicle so that it may support the upper end of a link, E, whose lower end pivotally engages the end of the transverse spring, F. For the purposes of the present invention the bracket, C, is rendered adjustable by loosening its securing nut, $C^1$, and is turned around 180°, or if preferred the two perches, C, may be interchanged so that the right hand perch is mounted at the left hand end of the axle, B, and vice versa. A fitting, G, formed for pivotal connection at $G^1$, to the end of the bracket, C, and for pivotal connection at $E^1$, to the upper end of the link, E, is also provided with a socket in which there is rigidly secured the thick end of an auxiliary leaf spring, H, shown in Fig. 2 as comprising three leaves, the longest of which is pivotally connected at $J^1$, to the upper ends of a pair of links, J, whose lower ends are pivotally mounted upon the thicker portion of the transverse spring, F, not far from its connection at $A^1$, to the frame, A. The mounting for the links, J, J, is provided by a saddle, K, hung upon the spring, F, with its side members, $K^1$, reaching just below the spring in position to receive the pivot bolt, $K^2$, engaging the links, J, at $J^2$. The saddle is maintained accurately at this position on the spring, F, by means of an extension having apertured lugs, $K^3$, reaching to the securing bolt, L, of the spring clip, M, said bolt being positively engaged by the curled end of the top leaf of the spring, F, so that when removed and reinserted through the apertured lugs, $K^3$, it provides adequate anchorage for the saddle member, K.

At the rear axle, N, which is shown in Fig. 3, the rear spring, P, is provided with an outfit similar to that furnished for the front spring, F, and modified only in dimensions, except that a new bracket or perch, Q, must be furnished because the original perch does not happen to be available by reversal as in the case of the front axle perches, C. The remaining parts being similar to those shown in Fig. 2, except as to detail dimensions, are provided with corresponding reference letters.

It will be understood that when the vehicle is in motion upon a more or less rough road the springs, F and P, are not subject to much movement at the parts at which the saddles, K, are lodged, so that the pivots, $J^1$, are nearly fixed with respect to the vehicle frame, A. Thus it will be seen that the thin ends of the springs, F and P, instead of supporting the vehicle directly upon their respective axles are hung upon yielding supports at E¹, so that any bump or jolt tending to flex the outer end of either of the main springs, F or P, must cause a greater movement of the axle to produce a given movement of the frame, A, out of its normal plane. That is, the more yielding connection between the axle and the frame due to the presence of the auxiliary springs, H, will serve to absorb more vibration of the wheels than could be absorbed by the springs, F and P, alone.

Another action of the auxiliary spring suspension embodying this invention is its tendency to minimize side sway of the vehicle body with respect to the running gear. It may be noted that the body is suspended from the running gear primarily by the links, E, E, which are both oblique to the perpendicular and in opposite directions with respect thereto, so that when the body tends to swing transversely one end of the transverse spring, F or P, will travel downward about an arc of which the link, E, is a radius, while the other end of the same spring must travel upward about an arc of which the other link, E, forms the radius. The upwardly traveling end of the spring, however, moves upward more rapidly than the opposite end moves downward, so that the resultant movement of the vehicle body is slightly upward, and gravity alone tends to oppose such movement and thus to oppose the side sway. But with the auxiliary springs, H, and their links, J, the side sway movement also tends to swing the links, J, about the centers, J¹; but since these links are of considerably greater radius than the links, E, though extending almost parallel to the respective links, E, the lower ends of said links, J, must traverse flatter arcs than the lower ends of the links, E, so that with the same amount of circumferential travel on these arcs their lower ends will not approach the springs, H, as rapidly as the lower ends of the links, E, and this difference of movement of two points, each rigidly related to a part of the same spring member, that is, to the spring, F, or the spring, P, must be accommodated by a deflection of one of said springs or of the auxiliary springs, H, and the resistance of such springs to deflection tends to resist the side sway of the vehicle body and frame, A, which would otherwise take place.

In the construction illustrated it will be noted that each of the transverse springs, F and P, is so rigidly fixed to the frame, A, at the middle of the frame that the opposite ends of these springs will act almost independently of each other as simple cantalivers. Each of the springs, H, is a simple cantaliver, but these auxiliary springs will be just as efficiently applicable to a spring suspension employing two semi-elliptic springs such as are commonly mounted to extend longitudinally of the vehicle frame, with their thin ends connected to the frame and with the vehicle axle mounted on the springs intermediate of the ends. I do not limit myself, therefore, to the combination of my auxiliary springs with the exact forms of vehicle springs illustrated in the drawings.

I claim:—

1. In combination with a vehicle body, an axle and a leaf spring of graduated thickness connecting them, a yielding mounting for the thin end of said leaf spring comprising a cantaliver spring fulcrumed on one of said parts which the leaf spring connects, said leaf spring having a pivot fixed to it at a point remote from its thin end, a pivot fixed to the end of the cantaliver spring remote from its fulcrum, a link connecting said pivots and another link connecting the thin end of the leaf spring to a part of said cantaliver spring intermediate its ends.

2. The combination as defined in claim 1, with said links of substantially different lengths.

3. The combination as defined in claim 1, with said leaf spring extending transversely of the vehicle body and having both its ends thinner than its middle portion and with a pair of such cantaliver springs each providing a yielding mounting for one end of the leaf spring.

4. The combination as defined in claim 1, with said leaf spring extending transversely of the vehicle body and having both ends thinner than its middle portion and with a pair of such cantaliver springs, each providing a yielding mounting for one end of the leaf spring, the two links associated with each cantaliver being of substantially different lengths.

5. The combination as defined in claim 1, with said leaf spring having a binding member associated with it and fixed at a definite point in the length thereof, and with the pivot on the leaf spring remote from its thin end fixed in position by a spacing member which holds the pivot in definite relation to said binding member.

6. The combination as defined in claim 1, with the said leaf spring having a clip secured to the end of one of its leaves; a saddle lodged on said leaf spring remote from its thin end with a part extending for positive connection to said clip; and with the pivot which is fixed to said leaf spring remote from its thin end carried by said saddle transversely under the spring.

7. The combination as defined in claim 1, with the said leaf spring having a clip secured to the end of one of its leaves; a saddle lodged upon said leaf spring remote from its thin end with a part extending for positive connection to said clip; the pivot which is fixed to said leaf spring remote from its thin end being carried by said saddle extending transversely in contact with the under side of the leaf spring whereby vertical play of the pivot with respect to said spring is prevented.

8. In combination with a vehicle body, an axle and a leaf spring of graduated thickness connecting them, a yielding mounting for the thin end of said leaf spring comprising an auxiliary spring having one end pivotally attached to a part of the leaf spring remote from the thin end thereof; and a fulcrum fitting comprising a socket in which the several leaves of the auxiliary spring are secured, and which is pivoted on one of said parts which the leaf spring connects, the thin end of the leaf spring being linked to the socket at a point intermediate such fulcrum pivot and the end of the auxiliary spring remote from the socket.

In testimony whereof I have hereunto set my hand at Chicago, Illinois, this 18th day of December, 1915.

DAVID NETTENSTROM.